US008462417B2

(12) United States Patent
Ide et al.

(10) Patent No.: US 8,462,417 B2
(45) Date of Patent: Jun. 11, 2013

(54) LIGHT ADJUSTING APPARATUS FOR POSITIONING AN INCIDENT LIGHT ADJUSTING UNIT

(75) Inventors: Takayuki Ide, Fussa (JP); Tomoya Ueda, Suwa (JP); Shunichi Shinohara, Hara-mura (JP); Eiji Mochizuki, Suwa (JP)

(73) Assignee: Olympus Corporation, Tokyo (JP)

( * ) Notice: Subject to any disclaimer, the term of this patent is extended or adjusted under 35 U.S.C. 154(b) by 217 days.

(21) Appl. No.: 12/973,495

(22) Filed: Dec. 20, 2010

(65) Prior Publication Data

US 2011/0085223 A1    Apr. 14, 2011

Related U.S. Application Data

(63) Continuation of application No. PCT/JP2009/060601, filed on Jun. 10, 2009.

(30) Foreign Application Priority Data

Jun. 19, 2008 (JP) ................................ 2008-160634

(51) Int. Cl.
*G02B 26/02* (2006.01)
(52) U.S. Cl.
USPC .......................................................... 359/233
(58) Field of Classification Search
USPC ................. 359/233, 232, 234, 385, 388, 389, 359/390, 894, 891, 892; 362/317, 319, 321, 362/351, 354, 360, 277, 278, 279, 290, 293, 362/311.01, 311.16; 396/355–359, 439–543
See application file for complete search history.

(56) References Cited

U.S. PATENT DOCUMENTS 3,277,772 A * 10/1966 Atwood ...................... 359/210.1
5,706,128 A * 1/1998 Greenberg ..................... 359/385
6,473,217 B2 * 10/2002 Imano ........................... 359/227

FOREIGN PATENT DOCUMENTS

| JP | 11-338001 | 12/1999 |
|----|-----------|---------|
| JP | 2001-174862 | 6/2001 |
| JP | 2005-195817 | 7/2005 |
| JP | 2006-330314 | 12/2006 |

OTHER PUBLICATIONS

International Preliminary Report on Patentability together with the Written Opinion dated Feb. 8, 2011.
International Search Report dated Sep. 15, 2009.

* cited by examiner

*Primary Examiner* — Stephone Allen
*Assistant Examiner* — Tamara Y Washington
(74) *Attorney, Agent, or Firm* — Scully, Scott, Murphy & Presser, P.C.

(57) ABSTRACT

A light adjusting apparatus includes a substrate (10, 40) having an aperture, a plurality of incident light adjusting units (20a, 20b, 20c) each moving in a same plane, and a plurality of driving units (50a, 50b, 50c) respectively driving the incident light adjusting units (20a, 20b, 20c), and adjusts an incident light passing through the aperture by mutually moving the incident light adjusting units (20a, 20b, 20c) with the driving units to an aperture position that is center-aligned with the aperture and a retracted position that is retracted from the aperture. An incident light adjusting unit that is moved to the aperture position is positioned by contacting with at least one of other incident light adjusting units that are retracted from the aperture.

17 Claims, 7 Drawing Sheets

LIGHT ADJUSTING APPARATUS FOR POSITIONING AN INCIDENT LIGHT ADJUSTING UNIT

CROSS-REFERENCE TO RELATED APPLICATIONS

The present application is based upon and claims the benefit of priority from prior Japanese Patent Application No. 2008-160634 filed on Jun. 19, 2008; the entire contents of which are incorporated herein by reference.

TECHNICAL FIELD

The present invention relates to a light adjusting apparatus.

BACKGROUND ART

A wide variety of systems have been in use as a variable optical device. One among them is an insertion-type variable optical device in which an optical characteristic of an incident light that passes through an optical path is changed by moving a single optical element, or a plurality of optical elements, in and out of the optical path with the help of an electromagnetic driving source or some other driving source. The functions of such an insertion-type variable optical device can be expanded by increasing the number of optical elements. With the recent development in an image quality of compact imaging equipments with a camera function, such as mobile equipments, micro-videoscopes, digital cameras, and endoscopic instruments, the shift in demand from a fixed-focus lens, a fixed-aperture diaphragm, and a fixed-characteristic filter to a variable-focus lens, a variable diaphragm, and a variable characteristic filter has been growing in the optical elements such as lenses, diaphragms, and optical filters. As an optical device to be applied to such compact imaging equipments, the above-described insertion-type variable optical device is drawing attention because of its simple structure. As an example of the insertion-type variable optical device suitable for downsizing, Japanese Patent Application Laid-open No. 2006-330314 discloses an optical device including a plurality of light shielding members each controlling an amount of light, a plurality of driving units respectively driving the light shielding members with an electromagnetic driving force from an electromagnetic circuit, and a base member for mounting the light shielding members and the driving units. In this optical device, downsizing the device while achieving stable driving is realized with a blocking member that blocks an inflow of a leakage flux in a mid portion of the driving units.

CITATION LIST

Patent Literature

Japanese Patent Application Laid-open No. 2006-330314

In Japanese Patent Application Laid-open No. 2006-330314, when the light shielding member is inserted in the optical path, a positioning of the light shielding member is achieved by a direct contact with a stopper member. Therefore, the stopper member must have a certain degree of rigidity enough to absorb an impact of bump with the light shielding member, and together with its figuration method, requires a certain degree of size, which hinders further downsizing the device. Furthermore, in Japanese Patent Application Laid-open No. 2006-330314, two optical elements, a shutter and a diaphragm, are described as examples of the light shielding member. However, when expanding the functions of the optical device by increasing the number of the light shielding members, mounting positions of the stopper members and moving areas of the light shielding members interfere with each other, resulting in a difficulty in further increasing the number of the light shielding members.

SUMMARY OF INVENTION

Technical Problem

The present invention has been made in view of the above discussion. It is an object of the present invention to provide, as a light adjusting apparatus having a plurality of optical elements, a light adjusting apparatus in which a positioning of each of the optical elements can be performed surely while achieving downsizing.

Solution to Problem

To solve the above problems and to achieve the above objects, a light adjusting apparatus according to an aspect of the present invention includes a substrate having an aperture, a plurality of incident light adjusting units each moving in a same plane, and a plurality of driving units respectively driving the incident light adjusting units, and that adjusts an incident light passing through the aperture by mutually moving the incident light adjusting units with the help of the driving units to an aperture position that is center-aligned with the aperture and a retracted position that is retracted from the aperture. An incident light adjusting unit that is moved to the aperture position is positioned by contacting with at least one of other incident light adjusting units that are retracted from the aperture.

In a light adjusting apparatus according to another aspect of the present invention, it is preferable that the incident light adjusting units that are retracted from the aperture position are positioned by contacting with a positioning member formed in an area outside an area for the incident light adjusting units to move.

In a light adjusting apparatus according to still another aspect of the present invention, it is preferable that the substrate includes a positioning hole for fixing the positioning member at a predetermined position on the substrate, and the positioning member includes a positioning protrusion that is fitted into the positioning hole formed on the substrate.

In a light adjusting apparatus according to still another aspect of the present invention, it is preferable that each of the incident light adjusting units includes a shaft member that moves each of the incident light adjusting units in a rotating manner and a fixing portion for fixing the shaft member, and the fixing portion is formed by burring.

In a light adjusting apparatus according to still another aspect of the present invention, it is preferable that each of the incident light adjusting units includes a thick portion formed at least on a portion that contacts with other incident light adjusting units when it is moved to the aperture position.

In a light adjusting apparatus according to still another aspect of the present invention, it is preferable that the incident light adjusting units include apertures of mutually different diameters.

In a light adjusting apparatus according to still another aspect of the present invention, it is preferable that the incident light adjusting units include different optical lenses from each other.

In a light adjusting apparatus according to still another aspect of the present invention, it is preferable that the incident light adjusting units include different optical filters from each other.

ADVANTAGEOUS EFFECTS OF INVENTION

The light adjusting apparatus is advantageous in that a positioning of each of the optical elements can be performed surely while achieving downsizing.

The above and other objects, features, advantages and technical and industrial significance of this invention will be better understood by reading the following detailed description of presently preferred embodiments of the invention, when considered in connection with the accompanying drawings.

Figure 1:
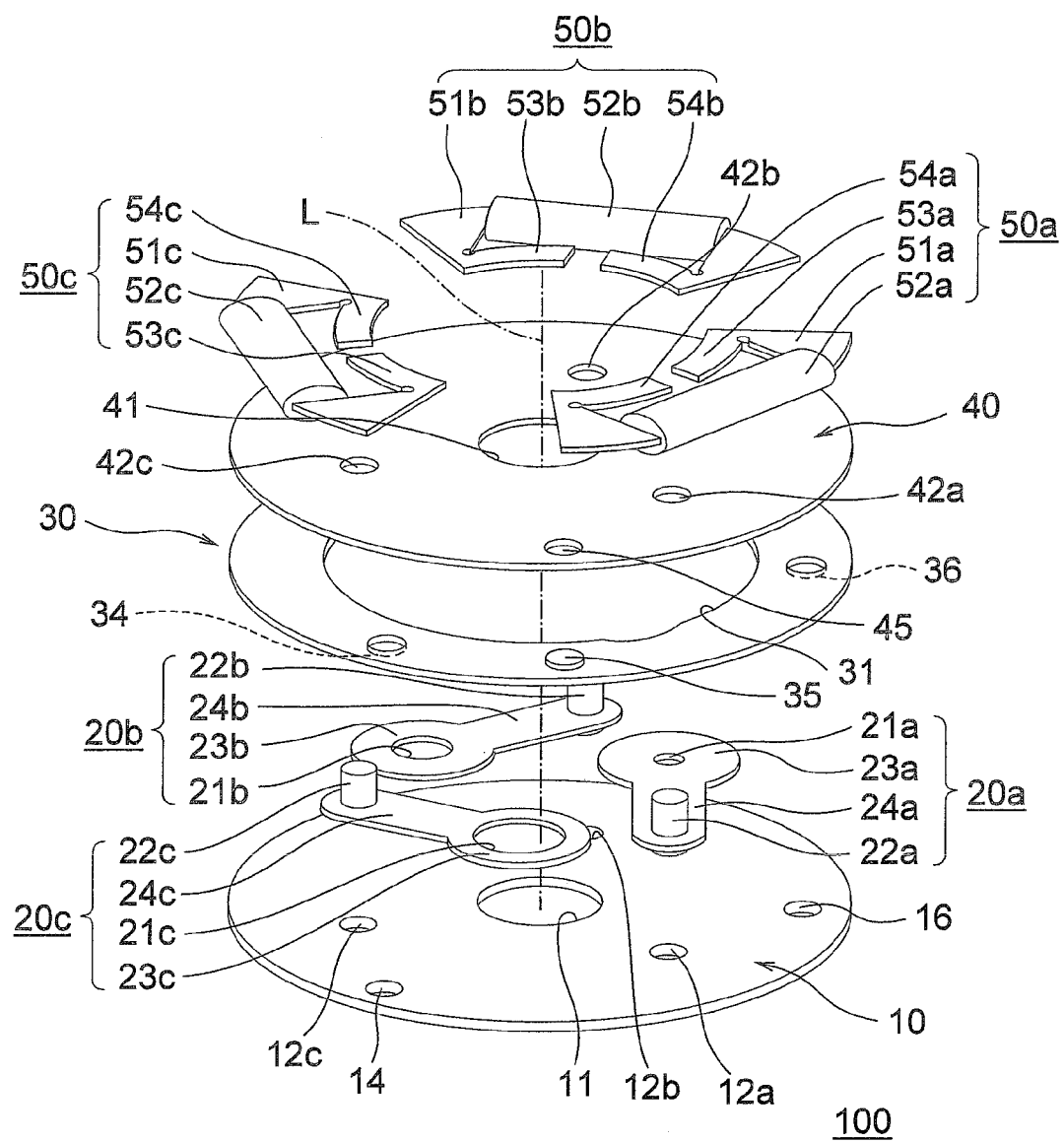
FIG. 1 is an exploded perspective view of a multistage variable diaphragm according to a first embodiment of the present invention.

REFERENCE SIGNS LIST 10 lower substrate (substrate)
11 circular-shaped first aperture (aperture)
14, 16, 18 spacer positioning hole
20a, 20b, 20c diaphragm plate (incident light adjusting unit)
21a, 21b, 21c aperture
22a, 22b, 22c shaft member
23a, 23b, 23c light shielding portion
24a, 24b, 24c arm portion
25a fixing portion
26a bump wall (a thick portion)
30 spacer (positioning member)
31 aperture
34, 35, 36, 37, 38, 39 positioning protrusion
40 upper substrate (substrate)
41 second aperture (aperture)
45, 47, 49 spacer positioning hole
50a, 50b, 50c coil (driving unit)
51a, 51b, 51c core
52a, 52b, 52c coil wire
53a, 53b, 53c arm portion
54a, 54b, 54c arm portion
100 multistage variable diaphragm (light adjusting apparatus)
120a diaphragm plate

DESCRIPTION OF EMBODIMENTS

Exemplary embodiments of a light adjusting apparatus according to the present invention are explained below with reference to accompanying diagrams. The present invention shall not be construed as being restricted by the embodiments explained below.

First Embodiment

A light adjusting apparatus according to a first embodiment of the present invention is explained with reference to FIGS. 1 to 6. The first embodiment is an example of applying the present invention to a multistage variable diaphragm that includes a plurality of diaphragm plates with different aperture sizes and in which an amount of light passing through the aperture is adjusted in a stepwise manner by moving the diaphragm plates in and out of an optical path.

Figure 2:
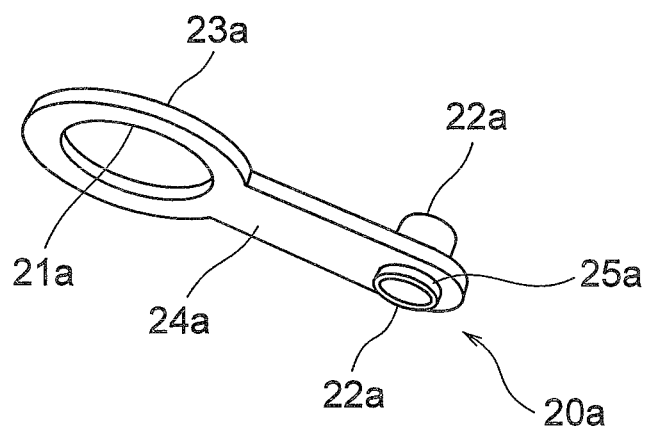
FIG. 2 is a perspective view of a diaphragm plate according to the first embodiment.
Figure 3:
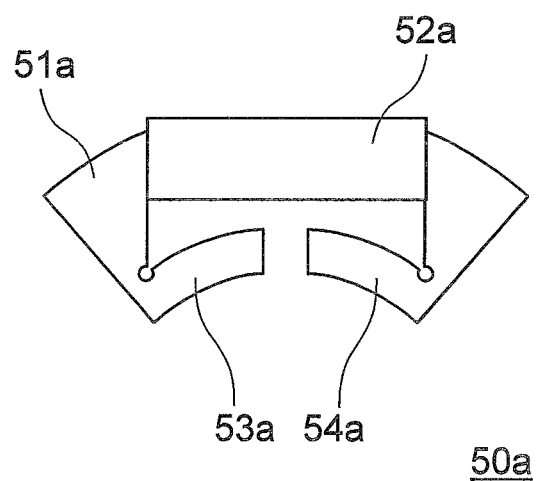
FIG. 3 is a plan view of a coil according to the first embodiment.
Figure 4:
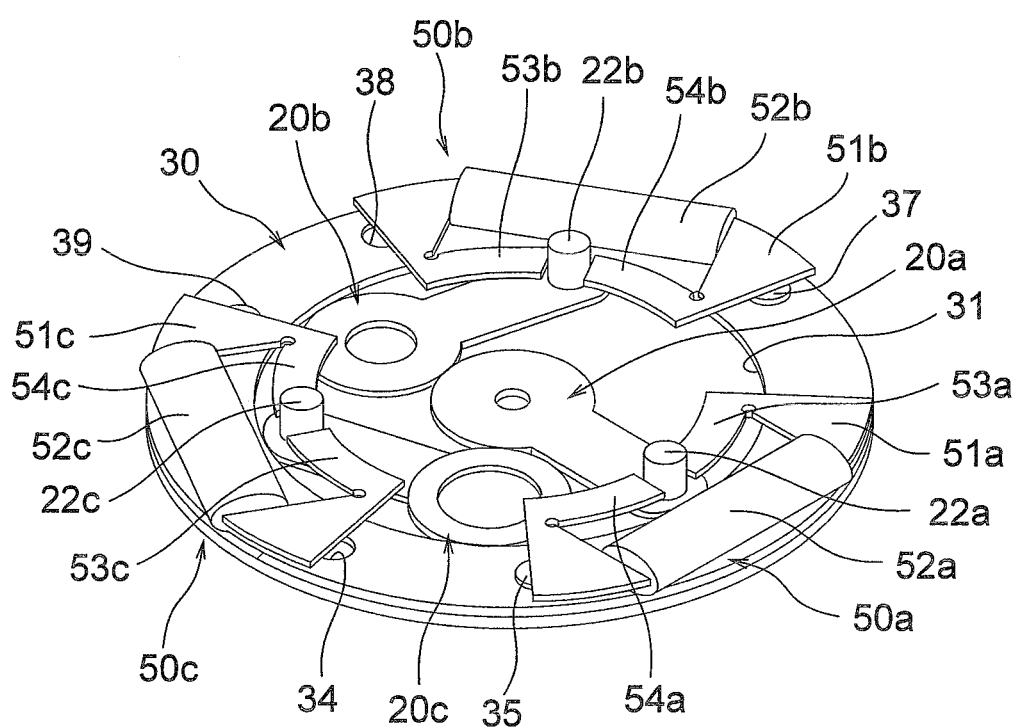
FIG. 4 is a perspective view of the multistage variable diaphragm in an assembled state.

A configuration of a multistage variable diaphragm 100 (light adjusting apparatus) according to the first embodiment is explained below with reference to FIGS. 1 to 4. FIG. 1 is an exploded perspective view of the multistage variable diaphragm 100 according to the first embodiment. FIG. 2 is a perspective view of a diaphragm plate 20a according to the first embodiment, viewed from underneath. Configurations of diaphragm plates 20b and 20c are the same as that of the diaphragm plate 20a. FIG. 3 is a plan view of a coil 50a according to the first embodiment. FIG. 4 is a perspective view of the multistage variable diaphragm 100 in an assembled state. An upper substrate 40 is omitted from FIG. 4.

As shown in FIGS. 1 and 2, the multistage variable diaphragm 100 according to the first embodiment includes a lower substrate 10 (substrate), the diaphragm plates 20a, 20b, and 20c (incident light adjusting units), a spacer 30 (positioning member), the upper substrate 40 (substrate), and a plurality of coils 50a, 50b, and 50c (driving units).

A circular-shaped first aperture 11 (aperture) is formed in the middle of the lower substrate 10 that is substantially disk-shaped. The lower substrate 10 includes a plurality of shaft holes 12a, 12b, and 12c and a plurality of spacer positioning holes 14, 16, and 18 (see FIGS. 1, 5, and 6). The diaphragm plates 20a, 20b, and 20c include apertures 21a, 21b, and 21c having different diameters from each other, and shaft members 22a, 22b, and 22c, respectively. The spacer 30 includes a plurality of positioning protrusions 34, 35, 36, 37, 38, and 39 (see FIGS. 1 and 4 to 6). A circular-shaped second aperture 41 (aperture) is formed in the middle of the upper substrate 40 (substrate) that is substantially disk-shaped. The upper substrate 40 further includes a plurality of shaft holes 42a, 42b, and 42c and a plurality of spacer positioning holes 45, 47, and 49 (see FIGS. 1, 5, and 6). The coils 50a, 50b, and 50c are formed by winding coil wires 52a, 52b, and 52c on cores 51a, 51b, and 51c, respectively.

Each of the component members is explained in detail below.

The lower substrate 10 and the upper substrate 40 are formed from a thin plate consisting of nonmagnetic material such as phosphor bronze, beryllium copper, and resin material by a processing method such as a press processing. The first aperture 11 and the second aperture 41 are arranged such that their aperture centers are center-aligned with an optical axis L, making an optical path through which an incident light passes. The first aperture 11 and the second aperture 41 can have the same or different diameters. When the first aperture 11 and the second aperture 41 have different diameters, the diameter that is smaller among the diameters of the first aperture 11 and the second aperture 41 becomes the maximum diameter of the multistage variable diaphragm 100.

The spacer 30 is a member that determines a space between the lower substrate 10 and the upper substrate 40 and their relative positions, which is formed from a thin plate consisting of nonmagnetic material by a processing method such as the press processing, just as the lower substrate 10 and the upper substrate 40. An aperture 31 is formed in the center of the spacer 30. Furthermore, the positioning protrusions 34, 35, 36, 37, 38, and 39 are formed around the aperture 31. The positioning protrusions 34, 36, and 38 are located at positions corresponding to the spacer positioning holes 14, 16, and 18 of the lower substrate 10, respectively. The positioning protrusions 34, 36, and 38 are formed on a bottom surface of the spacer 30 protruding downwards (downward direction in FIG. 1) by the press processing. The positioning protrusions 35, 37, and 39 are located at positions corresponding to the spacer positioning holes 45, 47, and 49 of the upper substrate 40, respectively. The positioning protrusions 35, 37, and 39 are formed on a top surface of the spacer 30 protruding upwards (upward direction in FIG. 1) by the press processing.

The positioning protrusions 34, 36, and 38 protruding on the bottom surface of the spacer 30 are fitted into the spacer positioning holes 14, 16, and 18 formed on the lower substrate 10, respectively, and the positioning protrusions 35, 37, and 39 protruding on the top surface of the spacer 30 are fitted into the spacer positioning holes 45, 47, and 49 formed on the upper substrate 40. By bonding the lower substrate 10 and the upper substrate 40 using an adhesive and the like via the spacer 30, the space between the lower substrate 10 and the upper substrate 40 are determined, and at the same time, their relative positions are determined.

The diaphragm plates 20a, 20b, and 20c are formed from nonmagnetic material in the same manner as the lower substrate 10 and the upper substrate 40, and they are formed from a thin plate that is thinner than the spacer 30 by a processing method such as the press processing. The diaphragm plates 20a, 20b, and 20c include light shielding portions 23a, 23b, and 23c and arm portions 24a, 24b, and 24c, respectively. The apertures 21a, 21b, and 21c that are smaller than the first aperture 11 and the second aperture 41 that are formed on the lower substrate 10 and the upper substrate 40, respectively, are formed on the light shielding portions 23a, 23b, and 23c. The apertures 21a, 21b, and 21c have different diameters from each other.

As shown in FIG. 2, a fixing portion 25a protrudes downwards in a cylindrical shape from the bottom surface of the diaphragm plate 20a. The fixing portion 25a is formed on the arm portion 24a of the diaphragm plate 20a by burring that is a type of the press processing. The shaft member 22a is fixed in the fixing portion 25a by press fitting or the like. Similarly, fixing portions are formed on the arm portions 24b and 24c of the diaphragm plates 20b and 20c, and the shaft members 22b and 22c are fixed in those fixing portions by press fitting or the like.

Each of the shaft members 22a, 22b, and 22c is made of a cylinder-shaped magnet, which is magnetized to the south pole and the north pole with respect to its radial direction. The shaft members 22a, 22b, and 22c are fitted into the shaft holes 12a, 12b, and 12c and the shaft holes 42a, 42b, and 42c formed on the lower substrate 10 and the upper substrate 40, respectively. With this configuration, the diaphragm plates 20a, 20b, and 20c rotate around the shaft members 22a, 22b, and 22c, respectively. The diaphragm plates 20a, 20b, and 20c are made to rotate in a single plane that is perpendicular to the optical axis L.

As shown in FIG. 3, the coil 50a is formed by winding the coil wire 52a on the core 51a. The core 51a is made of ferromagnetic material such as silicon steel and permalloy. Arm portions 53a and 54a are mutually magnetized to the south pole and the north pole depending on a direction of a current flowing through the coil wire 52a. The coils 50b and 50c have the same configuration as that of the coil 50a.

As shown in FIG. 4, in the coils 50a, 50b, and 50c, the shaft member 22a is arranged between the arm portions 53a and 54a facing each other, the shaft member 22b is arranged between the arm portions 53b and 54b facing each other, and the shaft member 22c is arranged between the arm portions 53c and 54c facing each other, in such a manner that the shaft members 22a, 22b, and 22c are sandwiched by the arm portions 53a and 54a, the arm portions 53b and 54b, and the arm portions 53c and 54c, respectively. The coils 50a, 50b, and 50c are attached by bonding the arm portions 53a, 53b, 53c, 54a, 54b, and 54c to the upper substrate 40.

Figure 5:
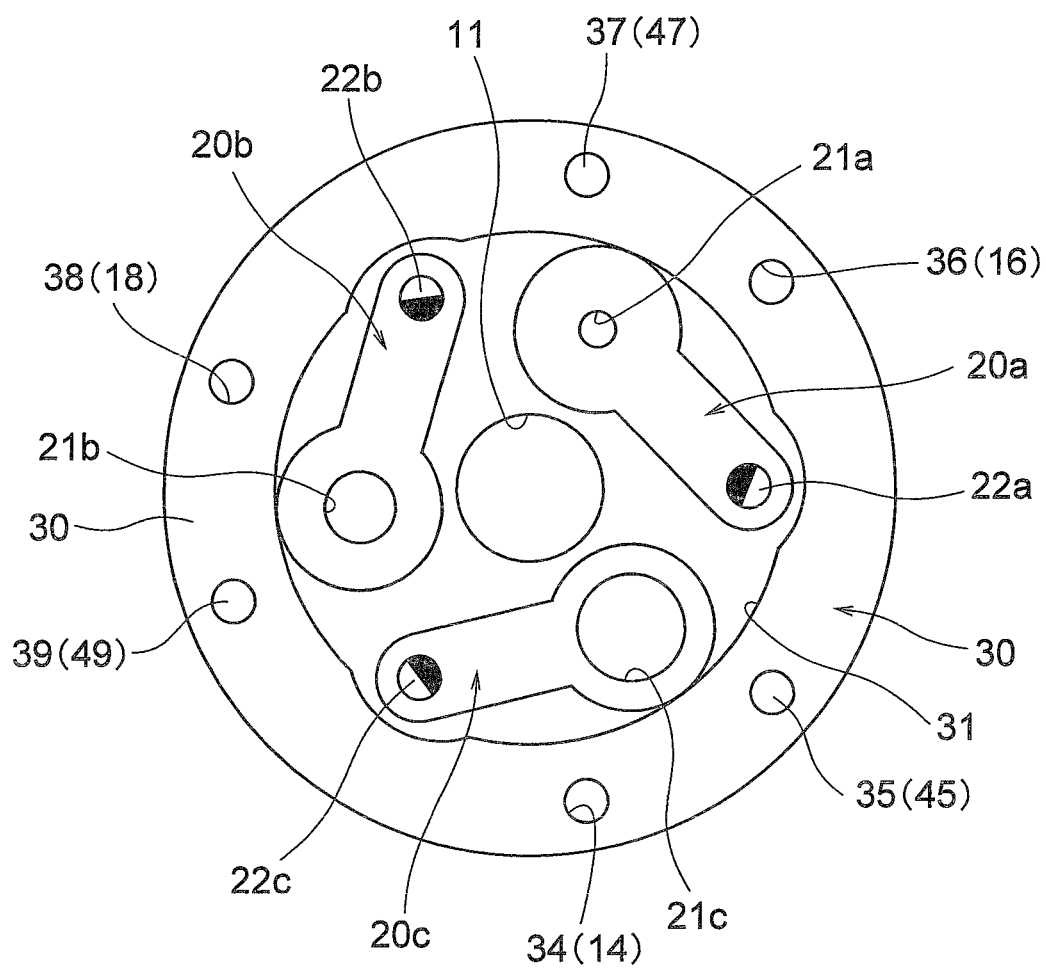
FIG. 5 is a plan view of a plurality of diaphragm plates all at retracted positions.
Figure 6:
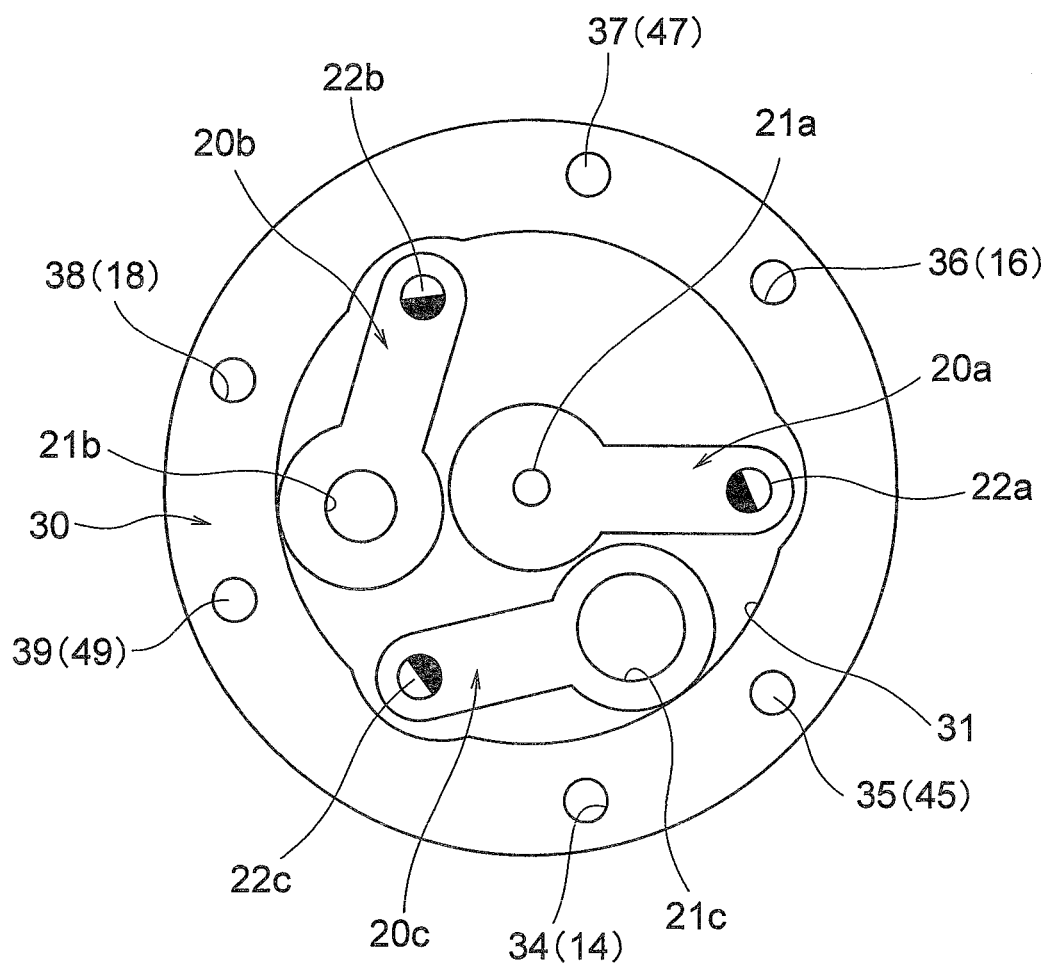
FIG. 6 is a plan view of the diaphragm plates in which one of the diaphragm plates is at an aperture position and the others at retracted positions.

An operation of the multistage variable diaphragm 100 according to the first embodiment is explained below with reference to FIGS. 3 to 6. FIG. 5 is a plan view of the diaphragm plates 20a, 20b, and 20c all at retracted positions. FIG. 6 is a plan view of the diaphragm plates 20a, 20b, and 20c in which the diaphragm plate 20a is at an aperture position and the other diaphragm plates 20b and 20c at the retracted positions. The upper substrate 40 is omitted from FIGS. 5 and 6.

By magnetically attracting and repelling forces between magnetic poles of the arm portions 53a, 53b, and 53c and the arm portions 54a, 54b, and 54c generated by the coils 50a, 50b, and 50c and magnetic poles of the shaft members 22a, 22b, and 22c, a rotational force is generated in the shaft members 22a, 22b, and 22c, by which the diaphragm plates 20a, 20b, and 20c are rotated around the shaft members 22a, 22b, and 22c, respectively. A direction of the rotation can be controlled by changing a direction of a current flowing through each of the coil wires 52a, 52b, and 52c.

FIG. 5 shows a state in which a rotational force in a clockwise direction in the figure is applied to each of the diaphragm plates 20a, 20b, and 20c. In this state, each of the diaphragm plates 20a, 20b, and 20c is rotated in the clockwise direction and stops upon contacting with the spacer 30. This state is referred to as the retracted state. In this state, the diaphragm plates 20a, 20b, and 20c are retracted from the first aperture 11 formed on the lower substrate 10 and the second aperture 41 formed on the upper substrate 40, so that the diameter of the optical path through which the incident light passes becomes that of either the first aperture 11 or the second aperture 41 which is smaller.

FIG. 6 shows a state in which the diaphragm plate 20a is rotated in a counterclockwise direction in the figure and the diaphragm plates 20b and 20c are rotated in the clockwise direction. The diaphragm plates 20b and 20c are rotated in the clockwise direction and stops upon contacting with the spacer 30.

On the other hand, the diaphragm plate 20a is rotated in the counterclockwise direction and stops upon contacting with the diaphragm plates 20b and 20c. This position of the diaphragm plate 20a is referred to as the aperture position. In this state, the diaphragm plate 20a is inserted in the optical path of the first aperture 11 formed on the lower substrate 10 and the second aperture 41 formed on the upper substrate 40, so that the diameter of the optical path through which the incident light passes becomes that of the aperture 21a formed on the diaphragm plate 20a. A shape of the aperture 31 of the spacer 30 and shapes of the diaphragm plates 20a, 20b, and 20c are optimized such that the center of the aperture 21a is center-aligned with the optical axis L.

Similarly, it is possible to set the diameter of the optical path through which the incident light passes to the aperture 21b formed on the diaphragm plate 20b, or the aperture 21c formed on the diaphragm plate 20c, by inserting the diaphragm plate 20b, or the diaphragm plate 20c, into the aperture position. This makes it possible to adjust the aperture diameter of the multistage variable diaphragm 100 in four steps.

A technical function and an effect obtained by the multistage variable diaphragm 100 according to the first embodiment is explained below.

As described above, in the multistage variable diaphragm 100 according to the first embodiment, a positioning of any one of the diaphragm plates 20a, 20b, and 20c when it is inserted into the aperture position is performed as follows. Firstly, a positioning of each of the other diaphragm plates that are retracted from the aperture position is performed by contacting them with an inner wall of the aperture 31 of the spacer 30. After that, a positioning of the diaphragm plate that is inserted into the aperture position is performed by contacting it with the diaphragm plates that are positioned by contacting with the inner wall of the aperture 31. Therefore, it is not necessary to provide a positioning member for directly positioning the diaphragm plate that is inserted into the aperture position.

As can be expected from FIG. 5, when a plurality of diaphragm plates are arranged, most of an area of a diaphragm mechanism (an area within the spacer 30 in the planar view) is occupied by an area for the diaphragm plates 20a, 20b, and 20c to rotate; and therefore, it is difficult to provide one more positioning member. If the positioning member is provided near the shaft members 22a, 22b, and 22c in an area outside the area for the diaphragm plates 20a, 20b, and 20c to rotate, because the aperture to be positioned is apart from a position of the positioning member, an error in a position of the positioning member and an error caused by a clearance between the shaft member and the shaft hole are increased, causing a problem that a position deviation in the final aperture is increased.

On the other hand, in the multistage variable diaphragm 100 according to the first embodiment, because the positioning of each member is performed by a direct contacting with a place where the positioning is performed, the position deviation equals an addition of errors forming the members. In the first embodiment, the diaphragm plates at the retracted positions contact with positioning members at positions on an extension of rotation trajectories of the centers of the apertures 21a, 21b, and 21c respectively formed on the diaphragm plates 20a, 20b, and 20c. Furthermore, each of the diaphragm plates contacts with the same positioning member. This makes it possible to reduce the position deviation of the final aperture compared to the above-described method. In addition, if the positioning member is provided for each of the diaphragm plates 20a, 20b, and 20c, a certain size of area is required according to necessary rigidity and forming method for the positioning member, which hinders downsizing of the diaphragm mechanism and increases manufacturing cost and processing time. From this point of view, the multistage variable diaphragm 100 according to the first embodiment contributes to an expansion of the function by providing a plurality of diaphragm plates, an enhancement of precision of the positioning, and a reduction of the manufacturing cost and the processing steps.

Furthermore, by substituting the diaphragm plates 20a, 20b, and 20c in the first embodiment with a plurality of optical lenses, it can be used as an optical lens inserting device.

Moreover, by substituting the diaphragm plates 20a, 20b, and 20c in the first embodiment with a plurality of optical filters, it can be used as an optical lens inserting device that can change an amount of transmitted light or a transmission wavelength band.

In addition, the positioning of the diaphragm plate that is moved to the aperture position can be performed by contacting it with all the other diaphragm plates that are retracted or one of the other diaphragm plates that are retracted. That is, it is sufficient to perform the positioning of the diaphragm plate that is moved to the aperture position by contacting it with at least one of the other diaphragm plates that are retracted.

Second Embodiment

Figure 7:
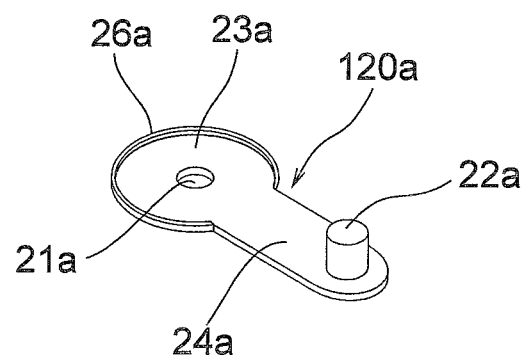
FIG. 7 is a perspective view of a diaphragm plate of a multistage variable diaphragm according to a second embodiment of the present invention.

A multistage variable diaphragm according to a second embodiment of the present invention is explained with reference to FIG. 7. FIG. 7 is a perspective view of a diaphragm plate 120a of the multistage variable diaphragm according to the second embodiment, viewed from above. The multistage variable diaphragm according to the second embodiment includes a plurality of diaphragm plates, in a similar manner to the diaphragm plates 20a, 20b, and 20c according to the first embodiment, and each of the diaphragm plates has the same configuration as the diaphragm plate 120a.

As shown in FIG. 7, the diaphragm plate 120a according to the second embodiment is different from the diaphragm plates 20a, 20b, and 20c according to the first embodiment in that a bump wall 26a (a thick portion) protruding upwards is formed on an outer circumference of the light shielding portion 23a.

In this manner, by providing the bump wall 26a, it is possible to prevent an operation failure due to the diaphragm plate that is moved to the aperture position getting into a space between a diaphragm plate that is retracted and the lower substrate or the upper substrate when performing the positioning of the diaphragm plate, and at the same time. Because the thickness of the diaphragm plate 120a is less than the thicknesses of the diaphragm plates 20a, 20b, and 20c, it is possible to reduce a weight of the diaphragm plate. As a result, it is possible to enhance an operation speed of the diaphragm plate and to reduce an impact of the bump.

Although the bump wall 26a is formed on the whole outer circumference of the light shielding portion 23a except for a connecting portion with the arm portion 24a, it is also possible to form the bump wall only in a portion that contacts with the other diaphragm plates.

Other factors such as a configuration, a technical function, and an effect of the second embodiment are the same as those of the first embodiment.

As described above, the light adjusting apparatus according to the present invention is suitable for a compact imaging equipment including a plurality of optical elements.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light adjusting apparatus comprising:
a substrate having an aperture;
a plurality of incident light adjusting units each movable in a same plane; and
a plurality of driving units respectively driving the plurality of incident light adjusting units, one of the plurality of driving units adjusting an incident light passing through the aperture by moving a first incident light adjusting unit of the plurality of incident light adjusting units to an aperture position that is center-aligned with the aperture,
wherein the first incident light adjusting unit that is moved to the aperture position is positioned by contacting the first incident light adjusting unit with at least a second incident light adjusting unit of the plurality of incident light adjusting units that being in a retracted position that is retracted from the aperture.

2. The light adjusting apparatus according to claim 1, further comprising a positioning member formed in an area outside an area for the plurality of incident light adjusting units to move,
wherein the at least a second incident light adjusting unit that is positioned in the retracted position by contacting the at least a second incident light adjusting unit with the positioning member.

3. The light adjusting apparatus according to claim 2, wherein:
the substrate includes a positioning hole for fixing the positioning member at a predetermined position on the substrate, and
the positioning member includes a positioning protrusion that is fitted into the positioning hole of the substrate.

4. The light adjusting apparatus according to claim 2, wherein the first incident light adjusting unit includes a thick portion formed at least on a portion that contacts with the second incident light adjusting unit when the first incident light adjusting unit is moved to the aperture position.

5. The light adjusting apparatus according to claim 4, wherein each of the plurality of incident light adjusting units includes an aperture, and the apertures of the plurality of incident light adjusting units have mutually different diameters.

6. The light adjusting apparatus according to claim 4, wherein each of the plurality of incident light adjusting units includes an optical lens, and the optical lenses of the plurality of incident light adjusting units are different from each other.

7. The light adjusting apparatus according to claim 4, wherein each of the plurality of incident light adjusting units includes an optical filter, and the optical filters of the plurality of incident light adjusting units are different from each other.

8. The light adjusting apparatus according to claim 3, wherein each of the plurality of incident light adjusting units includes an aperture, and the apertures of the plurality of incident light adjusting units have mutually different diameters.

9. The light adjusting apparatus according to claim 3, wherein each of the plurality of incident light adjusting units includes an optical lens, and the optical lenses of the plurality of incident light adjusting units are different from each other.

10. The light adjusting apparatus according to claim 3, wherein each of the plurality of incident light adjusting units includes an optical filter, and the optical filters of the plurality of incident light adjusting units are different from each other.

11. The light adjusting apparatus according to claim 2, wherein
each of the incident light adjusting units includes a shaft member that moves each of the incident light adjusting units in a rotating manner and a fixing portion for fixing the shaft member, and
the fixing portion is formed by burring.

12. The light adjusting apparatus according to claim 11, wherein each of the plurality of incident light adjusting units includes an aperture, and the apertures of the plurality of incident light adjusting units have mutually different diameters.

13. The light adjusting apparatus according to claim 11, wherein each of the plurality of incident light adjusting units includes an optical lens, and the optical lenses of the plurality of incident light adjusting units are different from each other.

14. The light adjusting apparatus according to claim 11, wherein each of the plurality of incident light adjusting units includes an optical filter, and the optical filters of the plurality of incident light adjusting units are different from each other.

15. The light adjusting apparatus according to claim 2, wherein each of the plurality of incident light adjusting units includes an aperture, and the apertures of the plurality of incident light adjusting units have mutually different diameters.

16. The light adjusting apparatus according to claim 2, wherein each of the plurality of incident light adjusting units includes an optical lens, and the optical lenses of the plurality of incident light adjusting units are different from each other.

17. The light adjusting apparatus according to claim 2, wherein each of the plurality of incident light adjusting units includes an optical filter, and the optical filters of the plurality of incident light adjusting units are different from each other.

* * * * *